United States Patent [19]
Okutsu

[11] Patent Number: 5,993,958
[45] Date of Patent: Nov. 30, 1999

[54] METHOD OF MANUFACTURING A POLYESTER-SERIES PHOTOGRAPHIC SUPPORT

[75] Inventor: Toshimitsu Okutsu, Minami-ashigara, Japan

[73] Assignee: Fuji Photo Film Co., Ltd., Minami-Ashigara, Japan

[21] Appl. No.: 08/785,771

[22] Filed: Jan. 21, 1997

[30] Foreign Application Priority Data

Jan. 25, 1996 [JP] Japan .................................... 8-030136

[51] Int. Cl.$^6$ ........................... B32B 27/18; B32B 27/20; B32B 37/36
[52] U.S. Cl. ........................... 428/338; 428/339; 428/480; 428/910; 264/280; 264/290.2; 430/517; 430/521; 430/523; 430/531; 430/533; 528/275; 528/276; 528/277; 528/285; 528/286; 528/308
[58] Field of Search ...................... 428/480, 910, 428/338, 339; 264/290.2, 280; 430/523, 531, 533, 517, 521; 528/275, 276, 277, 285, 286, 308

[56] References Cited

U.S. PATENT DOCUMENTS

| | | | |
|---|---|---|---|
| 4,732,799 | 3/1988 | Sakamoto et al. | 428/141 |
| 5,023,291 | 6/1991 | Sakamoto et al. | 524/430 |
| 5,188,774 | 2/1993 | Nitta et al. | 264/22 |
| 5,620,829 | 4/1997 | Kawamoto et al. | 430/523 |

FOREIGN PATENT DOCUMENTS 7168309 7/1995 Japan .

*Primary Examiner*—Vivian Chen
*Attorney, Agent, or Firm*—Burns, Doane, Swecker & Mathis, LLP

[57] ABSTRACT

There is disclosed a method of manufacturing a polyester-series photographic support, comprising the steps of: incorporating at least one anthraquinone-series dye into a polyester, which polyester is produced by a condensation polymerization reaction of a dicarboxylic acid component that comprises a dialkyl ester of naphthalene-2,6-dicarboxylic acid as a main component, with a diol component that comprises ethylene glycol as a main component, the polyester being produced by allowing manganese, magnesium, antimony, and phosphorus to be incorporated in specific amounts, whereby the polyester has melt electric resistance in terms of common logarithm (log R) in the melt state at 300° C. in the range of from 7.0 to 9.5, and intrinsic viscosity, measured in a mixture solution of phenol/tetrachloroethane (6/4, weight ratio) at 25° C., in the range of from 0.49 to 0.65; processing the polyester to a film according to the electrostatic impression method; and subjecting the film to biaxially stretching, to form a transparent polyester film. According to the method, a polyester-series photographic support that has a good transparency, that is excellent in core-set curl resistance, and that is suitable for not only sheet-like photographic articles but also roll-like photographic articles, can be provided.

20 Claims, No Drawings

METHOD OF MANUFACTURING A POLYESTER-SERIES PHOTOGRAPHIC SUPPORT

FIELD OF THE INVENTION

The present invention relates to a method of manufacturing a photographic support that is made of a polyester-series film composed of polyethylene naphthalate as a main component. In particular, the present invention relates to a polyester-series photographic support that is excellent in hue and transparency, that contains a reduced amount of extraneous matter in a film, and that excels in mechanical characteristics and core-set curl resistance.

BACKGROUND OF THE INVENTION

Generally, a photographic light-sensitive material is manufactured by coating at least one photographic light-sensitive layer onto one surface of a plastic film support, and further optionally by coating a magnetic recording layer, or a backing layer, onto the other surface of the support. Up to now, fiber-series polymers, represented by triacetylcellulose (hereinafter referred to as "TAC"), and polyester-series polymers, represented by polyethylene terephthalate (hereinafter referred to as "PET"), have been used for the plastic film support.

The TAC film has a problem that needs to be solved from the viewpoint of the environment, because an organic solvent is used in the course of producing the film. The TAC film also has a weak point of mechanical strength. The PET film has been widely used for sheet-like-shaped articles, such as an X-ray film, lith film, and cut film. However, when the PET film is used for a photographic support that is encased into a patrone (a magazine) in the form of a roll and in the size (width) of 35 mm or less, the same has a strong core-set curl. Therefore the PET film is not always satisfactory, because such problems as out-of-focus arise in the step of printing to a photographic printing paper. Further, with respect to a base film for a magnetic recording medium, JP-A ("JP-A" means unexamined published Japanese patent application) No. 113529/1987 discloses a proposed method for improving both the flatness of the film and the workability of handling of the film. In the method, a film is made of polyethylene naphthalate (a raw material) whose specific resistance when it is melted is in a specific range, according to an electrostatic-applied cooling process, and further the thus-obtained film is modified so that a specific formula can be satisfied by the relation between the surface roughness of the film and the thickness of the film.

In particular, recently usages of photographic light-sensitive material have expanded, and further high-speed conveyance of film at photographing and miniaturization of photographic devices have progressed. Accordingly, there is a demand for a photographic support having not only core-set curl resistance, but also mechanical strength and dimensional stability that are satisfactory for a thin film. However, this demand cannot be adequately met by the conventional TAC films and PET films. So, there is need for development of a photographic support that can meet this demand.

SUMMARY OF THE INVENTION

Accordingly, an object of the present invention is to provide a method of manufacturing a polyester-series photographic support that has a good transparency, that is excellent in core-set curl resistance, and that further is suitable for not only sheet-like photographic articles but also roll-like photographic articles.

Another object of the present invention is to provide a polyester-series photographic support that has a good transparency, that is excellent in core-set curl resistance, and that further is suitable for not only sheet-like photographic articles but also roll-like photographic articles.

Other and further objects, features, and advantages of the invention will appear more fully from the following description.

DETAILED DESCRIPTION OF THE INVENTION

The above-described objects of the present invention have been attained by the following production method of a photographic support:

A method of manufacturing a polyester-series photographic support, comprising the steps of: incorporating at least one anthraquinone-series dye into a polyester, which polyester is produced by a condensation polymerization reaction of a dicarboxylic acid component that comprises a dialkyl ester of naphthalene-2,6-dicarboxylic acid as a main component, with a diol component that comprises ethylene glycol as a main component, the polyester being produced by allowing elements to be incorporated in the concentrations as defined by formulae (1) to (3), whereby the obtained polyester has melt electric resistance in terms of common logarithm (log R) in the melt state at 300° C. in the range of from 7.0 to 9.5, and intrinsic viscosity, measured in a mixture solution of phenol/tetrachloroethane (6/4, weight ratio) at 25° C., in the range of from 0.49 to 0.65; processing the thus-obtained polyester to a film according to the electrostatic impression method; and subjecting the film to biaxially stretching, to form a transparent film that has center line average roughness (Ra) in the range of from 0.0005 to 0.05 and film haze of not more than 1.5%:

$$0.82 \leq M \leq 3.20 \tag{1}$$

$$0.95 \leq S_b \leq 2.45 \tag{2}$$

$$0.20 \leq P/M \leq 2.75 \tag{3}$$

wherein M represents a manganese element or a magnesium element, or a mixture thereof, and the concentration means a number of moles per $10^6$ g of the polyester; $S_b$ represents an antimony element, and the concentration means a number of moles per $10^6$ g of the polyester; and P represents a phosphorus element, and the concentration means a number of moles per $10^6$ g of the polyester.

In the present invention, preferably, with respect to the formed transparent film, transmittance at 400 nm in terms of the thickness of the film of 90 μm is not less than 65%, and the b value of three piled sheets of the film is not more than 4.5.

Hereinafter the production method of the polyester for use in the present invention is further described in detail.

Examples of the polyester that is referred to as "polyester-series" in the present invention include homopolyesters, such as PET, polyethyle nenaphthalate (hereinafter referred to as "PEN"), polycyclohexanedimethylene terephthalate (hereinafter referred to as "PCT"), polybutylene terephthalate (hereinafter referred to as "PBT"), and polybutylene naphthalate (hereinafter referred to as "PBN"); copolymerization polyesters composed of these homopolyesters as a main component, and blends of these polyesters. However, the polyester for use in the present invention is composed of PEN as a main component. Herein, the terminology "composed of PEN as a main component" means that the PEN component is contained in the polyester in an amount of preferably not less than 70 mol %, and further preferably from 80 mol % to 100 mol %.

Usually, a polyester is produced by a direct esterification reaction of a dicarboxylic acid, or a diester of a dicarboxylic acid and a lower aliphatic alcohol, with a diol, or by a transesterification reaction, followed by a condensation polymerization reaction. This production method per se is a known method.

A method for producing a polyester film that is composed of PEN as a main component according to the present invention is described below in detail, with reference to an example in which the polyester is exclusively composed of PEN.

The PEN for use in the present invention may be produced by a batch process, a semi-continuous system, or a continuous system. For convenience, the production method is explained below, with reference to a transesterification of the batch process.

A mixture of 2,6-naphthalenedicarboxylic acid di-methylester (hereinafter referred to as NCM) and ethylene glycol, in an amount of 2.01 to 2.5 molar times as much as the NCM, is subjected to transesterification reaction in the presence of a known catalyst for transesterification, such as a manganese compound, a magnesium compound, and a calcium compound, at 150° C. to 260° C., and then methanol, which is a by-product, is removed by distillation, to obtain 2,6-naphthalenendicarboxylic acid diethylene glycol ester, or its lower polymer (hereinafter referred to as an oligomer). The transesterification generally takes 2 to 6 hours.

After that, the above-described oligomer is subjected to a condensation polymerization reaction, in the presence of both a known catalyst for the condensation polymerization reaction, such as an antimony compound, a germanium compound and a titanium compound, and a known heat-resistant stabilizer, i.e. phosphoric acid, phosphorous acid, or esters of these acids, at 280° C. to 300° C. under a reduced pressure of ultimately 1 mm Hg to 0.2 mm Hg, and then the residual ethylene glycol is removed by distillation, to obtain the PEN. This process generally takes 3 to 6 hrs.

The thus-obtained PEN is taken out, for example, in the molten state, from the bottom of a reaction vessel in the form of strands. After cooling with water, the PEN is cut into pellets. After drying, these pellets are processed into a film, whereby a biaxially stretched (oriented) film is obtained.

Examples of the catalyst for use in the transesterification include the above-mentioned manganese, magnesium, and calcium compounds. Preferred of these compounds are manganese compounds, magnesium compounds, and a mixture thereof. Acetic acid salts of these metals are particularly preferably used. The amount of the catalyst to be used is in the range of from 0.82 to 3.20 mol in terms of the metal element, per $10^6$ g of the polyester to be produced (hereinafter the amount is expressed on the same basis as above), and preferably from 0.95 to 2.65 mol. When this amount is too small, transesterification does not progress smoothly. On the other hand, when the amount is too large, concern increases regarding both yellowing and the occurrence of an extraneous substance due to aggregation.

Further, examples of the catalyst for use in the condensation polymerization reaction include the above-described antimony, germanium, and titanium compounds, with the antimony compounds preferred. Antimony trioxide is particularly preferably use. The amount of these compounds to be used is in the range of from 0.95 to 2.45 mol, and preferably from 1.22 to 2.05 mol, per $10^6$ g of the polyester to be produced. When the amount is too large, concern increases regarding the occurrence of an extraneous substance due to aggregations. The amount of a phosphorus compound, such as phosphoric acid, that is used as a heat-resistant coloring stabilizer is in the range of from 0.2 to 2.75, and preferably from 0.25 to 2.50, in terms of the P/M molar ratio based on molar amounts per $10^6$ g of the polyester. When this amount is too small, yellowing occurs due to the high temperature generated during the production of pellets and in the course of the film production. On the other hand, when the amount is too large, activity of the catalyst is deteriorated, whereby concern arises, in particular, that the condensation polymerization reaction may be adversely inhibited.

The present invention is directed to a method for producing a polyester-series photographic support that is composed of PEN as a main component, and the dicarboxylic acid component used in making of the polyester comprises naphthalenedicaboxylic acid as a main component.

Examples of the naphthalenedicarboxylic acids for use in the production of the polyester include 2,6-naphthalenedicarboxylic acid, or alkyl esters hereof, 1,5-naphthalenedicarboxylic acid, and 2,7-naphthalenedicarboxylic acid, each of which may have a substituent. For example, 4-sulfo-2,6-naphthalenedicarboxylic acid, and alkyl esters thereof, also can be used. Further, as long as the characteristics of the polyester are not adversely affected, the naphthalenedicarboxylic acid may be copolymerized with another dicarboxylic acid component, such as an aliphatic dicarboxylic acid component (e.g. adipic acid and sebacic acid), an aromatic dicarboxylic acid component (e.g. phthalic acid, isophthalic acid, biphenyldicarboxylic acid, and a sodium 5-sulfoisophthalate), an alicyclic dicarboxylic acid component (e.g. 1,4-cychohexanedicarboxylic acid), or alkyl esters of these dicarboxylic acids. Further, the naphthalenedicarboxylic acid may be copolymerized with glycols, such as diethylene glycol, triethylene glycol, butanediol, 1,4-cyclohexane dimethanol, and polyethylene glycol; and alternatively or additionally it may be copoymerized with a multifunctional component, such as trimellitic acid and glycerol. Further, various homopolymers that are derived from the above-mentioned components may be blended.

Further, to the polyester for use in the present invention can be optionally added various additives, such as an antioxidant (e.g. known hindered phenols); lubricants, such as organic crosslinked polymer particles and inactive inorganic particles (e.g. silica, alumina, calcium compounds); and alternatively or additionally dyes and pigments, as disclosed in KOKAIGIHO No. 94-6023, published by Hatsumei Kyokai.

The above-mentioned production method of the polyester is explained with reference to a melting polymerization process according to the batch system. After the melting polymerization, a solid-phase polymerization may be further applied thereto.

Generally, the intrinsic viscosity of the polyester varies depending on the content of PEN that is a main component of the polyester. The intrinsic viscosity of the polyester for use in the present invention is in the range of from 0.49 to 0.65. When the intrinsic viscosity of the polyester is too low, the mechanical strength (e.g. Young's modulus, tear strength) of a film that is made of the polyester is poor. Consequently, such a film is not preferable even as a general-use film. On the other hand, when the intrinsic viscosity of the polyester is too high, preferable characteristics, such as strong mechanical strength, are given to a film that is made of the polyester. However, there is a problem concerning such economic demerits that production of such a polyester takes a long time, and that the increase of the filter pressure in the course of the production is fast, which results in a need for frequent exchanging of the filter.

The melt electric resistance in terms of common logarithm (hereinafter referred to as log R, wherein R represents electric resistance) according to the present invention is a value of the electric resistance between two electrodes in a melted polyester. Accordingly, the higher the melting temperature is, the lower the value of log R is. However, for convenience, an explanation is continued with reference to log R at 300° C., which is a temperature corresponding to the melting condition in the practical production of a film.

The value of melt electric resistance, log R, of the polyester that is composed of PEN as a main component for use in the present invention, is in the range of from 7.0 to 9.5, preferably from 7.5 to 9.5. When a polyester whose log R is higher than 9.5 is used, its electrostatic adhesiveness in the course of the film production is so extremely poor that it is difficult to obtain a non-stretched base having good flatness.

The inventor has intensively investigated the relationship between the log R and the electrostatic adhesiveness. As a result, the inventor has found that the value of log R can be reduced to the range of lower than 7.0 by the addition of a compound comprising a metal, such as manganese, magnesium, and zinc, in an amount larger than the amount to be used as a catalyst, or by the addition of a phosphorus compound, in an amount extremely lower than the ordinary amount of a heat resistance stabilizer to be used, or by the addition of a quaternary ammonium salt, or by a combination of these methods, in the course of the polyester production. The inventor found, by the above reduction of log R, that the electrostatic adhesiveness in the course of the melt film production can be improved, and that a high-speed film production can be operated, each of which results in large economical merits.

However, on the other hand, the above-described addition of a compound comprising a metal, such as manganese and magnesium, in such a large amount causes aggregation of these metal compounds, whereby a film containing a large amount of extraneous matter, which is not preferable, is obtained. These extraneous matters can be removed by improvement in the efficiency of a filter to be used, but this is expensive. Further, the reduced amount of a phosphorus compound, as well as the large amount of these metal compounds to be added, causes coloring of the polymer, which results in a strongly yellowish film. On the other hand, there is need for a photographic support excellent in core-set curl resistance and mechanical strength, each of which is necessary for the miniaturization of a photographing device and for the usage of a thin film. Additionally, there is need for a polyester-series photographic support that is composed of PEN per se, or that contains, as a main component, PEN, that is transparent and slightly or non-yellow-tinted, and that further contains a reduced amount of the extraneous matter causing trouble to a photographic printing paper at the time of enlargement printing. Accordingly, the above-described method is not preferred. PEN itself is transparent if particles of foreign matter are not formed, and a support using PEN has good core-set-curl preventing property.

A method of manufacturing a film according to the present invention, and characteristics of the thus-obtained film, are explained below.

In the present invention, a film can be manufactured by a usual electrostatic impression method. Stated in detail, the photographic support of the present invention can be obtained by a method that comprises the steps of cooling, on a cooling drum, a pre-hardened sheet that is extruded from a mouthpiece of a melt extruder that has been heated at a temperature ranging from 280° C. to 310° C., to obtain a pre-stretched sheet, then stretching and orienting the pre-stretched sheet two- to five-fold times its size, successively or simultaneously, in the longitudinal (length) direction and in the horizontal (width) direction, and further subjecting the stretched sheet to a heat treatment, such as heat-setting and heat-annealing. Further, in the above-described method, a pre-stretched sheet having improved flatness can be obtained by setting an electrode that is composed of a fine line (e.g. a tungsten line of a diameter 0.1 mm), at a right angle to the flow of the pre-hardened sheet, between the mouthpiece of the melt extruder and the cooling drum, and impressing direct current voltage of generally from 5 KV to 15 KV to the electrode, so that adhesiveness of the pre-hardened sheet onto the cooling drum can be improved. At this time, it is effective, in order to obtain a pre-stretched sheet having improved flatness, that a method of uniformly coating a thin layer of a liquid (e.g. water) onto a cooling drum is applied to the above-described method.

The shape of the pre-stretched sheet thus obtained in this step influences a biaxially stretched orientation film to be manufactured in the next step. Consequently, it is important to obtain a sheet without such marks as waviness and mesh of straw matting.

It is effective for the stabilization of the quality of the product and the production steps, to set a filter in the course up to the mouthpiece of the melt extruder, for the removal of dusts intermixed in the production steps, and/or to employ a gear-pump for keeping the discharge amount at constant.

In the steps of film production during the course of the production method of a polyester for use in the present invention, the thickness of the pre-stretched sheet is preferably from 0.45 mm to 2.5 mm, and the width of the produced film is generally from 0.2 m to 3 m. However, these thickness and width can be properly chosen in view of the purpose of the film production and from an economical viewpoint.

The size increase that results from the stretching is generally from 2- to 5-fold, and preferably from 3- to 4.5-fold, in both the longitudinal direction and the width direction. After the biaxially stretching and orientation, the film is further subjected to heat-setting at a temperature that is 5 to 30° C. lower than its melting point, and the film is furthermore subjected to heat-annealing (thermal shrinkage) in 1% to 10%. The thickness of the thus-obtained film is generally from 50 $\mu$m to 120 $\mu$m.

Further, the biaxially stretching orientation may be carried out by simultaneous biaxially stretching, or successive biaxially stretching. After the stretching, the stretching may be repeated in the longitudinal direction or the horizontal direction. In order to improve the core-set curl, heat treatment at a temperature not higher than the glass transition point, as described in U.S. Pat. No. 4,141,735, may be carried out.

The photographic support that is manufactured by the method of the present invention is excellent in flatness and transparency. Stated in detail, the flatness, which is represented by the center line average roughness ($R_a$), is in the range of from 0.0005 to 0.05, preferably from 0.0005 to 0.015, and most preferably from 0.0005 to 0.010. The transparency is represented both by the haze of a film of 90

μm thickness, and by the light transmittance at 400 nm. The haze of the film manufactured by the present invention is not more than 1.5%, and preferably not more than 1.0%, and the light transmittance of the film is not less than 65%. Each of these characteristics is essential to obtain a vivid (clear, sharp) photographic image.

The degree of yellowing of a film is represented by the value of b. A sheet of film of 90 μm thickness is too thin to accurately measure the degree of yellowing, so the value of b is measured using three piled sheets. The value of b in the present invention is not more than 4.5, and preferably not more than 4.0.

When PEN is compared to PET, the former's melting point is only about 10° C. higher than the latter's, but the former's melt viscosity is much higher than the latter's. For example, common PET's melt viscosity at 280° C. is about 3000 ps, whereas PEN's melt viscosity reaches 6000 ps to 8000 ps. Consequently, the temperature at the time of production of PEN, or its film, is required to be made higher than that for PET, and the difference between the temperatures at the time of production is larger than a difference in the melting point between PEN and PET. Therefore, by this high temperature, which goes beyond the essential heat-resistance stability, a yellowish product is likely manufactured for PEN or its film. Yellowing of the film is not preferred because of such problems as that the yellowing is unattractive to look at, and further the yellowing decreases sensitivity when the yellowish film is used as a photographic support. In order to prevent a support from yellowing, it is necessary to decrease the temperature at the time of production of pellets or a film, to as low as possible. However, it is difficult to accomplish commercial-scale production only by the above-described means. In the present invention, preferably at least one anthraquinone-series dye represented by general formula (I) or (II) is added in making the film.

General formula (I)

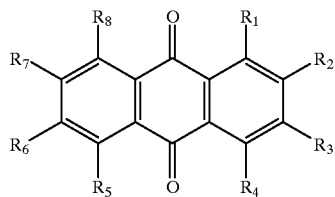

wherein $R_1$, $R_2$, $R_3$, $R_4$, $R_5$, $R_6$, $R_7$, and $R_8$ each represent a hydrogen atom, a hydroxyl group, an aliphatic group, an aromatic group, a heterocyclic group, a halogen atom, a cyano group, a nitro group, $COR_9$, $COOR_9$, $NR_9R_{10}$, $NR_{10}COR_{11}$, $NR_{10}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$, or $SO_2NHCOR_{11}$; $R_9$ and $R_{10}$ each represent a hydrogen atom, an aliphatic group, an aromatic group, or a heterocyclic group; $R_{11}$ represents an aliphatic group, an aromatic group, or a heterocyclic group; $R_9$ and $R_{10}$ may bond together to form a 5- or 6-membered ring; and $R_1$ and $R_2$, or $R_2$ and $R_3$, may bond together to form a ring.

General formula (II)

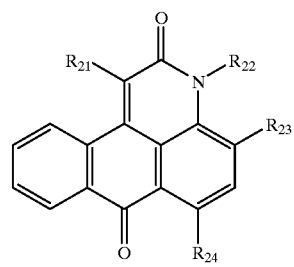

wherein $R_{21}$, $R_{23}$, and $R_{24}$ each represent a hydrogen atom, a hydroxyl group, an aliphatic group, an aromatic group, a cyano group, a nitro group, $COR_{29}$, $COOR_{29}$, $NR_{29}R_{30}$, $NR_{30}COR_{31}$, or $NR_{30}SO_2R_{31}$; $R_{22}$ represents an aliphatic group or an aromatic group; $R_{29}$ and $R_{30}$ each have the same meanings as $R_9$ and $R_{10}$ in general formula (I); $R_{31}$ has the same meaning as $R_{11}$ in general formula (I), with the proviso that at least one of $R_{21}$, $R_{22}$, $R_{23}$, and $R_{24}$ is a group other than a hydrogen atom.

Each of the groups mentioned in general formula (I) is explained below in detail.

Examples of the aliphatic group represented by $R_1$ to $R_{11}$ include an alkyl group having 1 to 20 carbon atoms (e.g. methyl, ethyl, n-butyl, isopropyl, 2-ethylhexyl, n-decyl, n-octadecyl), a cycloalkyl group having 3 to 20 carbon atoms (e.g. cyclopentyl, cyclohexyl), and an allyl group, each of which groups may have a substituent [such as a halogen atom (F, Cl, Br, I), a hydroxyl group, a cyano group, a nitro group, a carboxylic group, an aryl group having 6 to 10 carbon atoms (e.g. phenyl, naphthyl), an amino group having 0 to 20 carbon atoms (e.g. $NH_2$, $NHCH_3$, $N(C_2H_5)_2$, $N(C_8H_{17})_2$, anilino, 4-methoxyanilino), an amido group having 1 to 20 carbon atoms (e.g. acetylamino, hexanoylamino, benzoylamino, octadecanoylamino), a carbamoyl group having 1 to 20 carbon atoms (e.g. unsubstituted carbamoyl, methylcarbamoyl, ethylcarbamoyl, octylcarbamoyl, hexadecylcarbamoyl), an ester group having 2 to 20 carbon atoms (e.g. methoxycarbonyl, ethoxycarbonyl, phenoxycarbonyl, n-butoxycarbonyl, dodecyloxycarbonyl), an alkoxy or aryloxy group having 1 to 20 carbon atoms (e.g. methoxy, ethoxy, butoxy, isopropoxy, benzyloxy, phenoxy, octadecyloxy), a sulfonamido group having 1 to 20 carbon atoms (e.g. methanesulfonamido, ethanesulfonamido, butanesulfonamido, benzenesulfonamido, octanesulfonamido), a sulfamoyl group having 0 to 20 carbon atoms (e.g. unsubstituted sulfamoyl, methylsulfamoyl, butylsulfamoyl, decylsufamoyl), and a 5- or 6-membered heterocyclic group (e.g. pyridyl, pyrazolyl, morpholino, pyrolino, benzoxazoyl)].

Examples of the aromatic group represented by $R_1$ to $R_{11}$ include an aryl group having 6 to 10 carbon atoms (e.g. phenyl, naphthyl), which group may have a substituent [such as those groups mentioned as a substituent that the above-described aliphatic group may have, and additionally an alkyl group having 1 to 20 carbon atoms (e.g. methyl, ethyl, butyl, t-butyl, octyl)].

Examples of the heterocyclic group represented by $R_1$ to $R_{11}$ include a group of a 5- or 6-membered heterocyclic ring (e.g. pyridine, piperidine, morpholine, pyrrolidine, pyrazol, pyrazolidine, pyrazoline, pyrazolone, and benzoxazole), which group may have a substituent, such as those groups mentioned as a substituent that the above-described aromatic group may have.

Examples of the 5- or 6-membered ring that is formed by the connection of $R_9$ and $R_{10}$ include morpholine, piperidine, and pyrrolidine rings. The ring that is formed by a connection of $R_1$ and $R_2$, or $R_2$ and $R_3$, is preferably a 5- or 6-membered ring (e.g. benzene, phthalimide rings).

Each of the groups mentioned in general formula (II) is explained below.

The aliphatic group represented by $R_{21}$ to $R_{24}$ has the same meaning as that represented by $R_1$ to $R_{11}$ of general formula (I).

The aromatic group represented by $R_{21}$ to $R_{24}$ has the same meaning as that represented by $R_1$ to $R_{11}$ of general formula (I).

Specific examples of the compounds represented by general formula (I) or (II) are illustrated below, but the present invention is not limited to those shown.

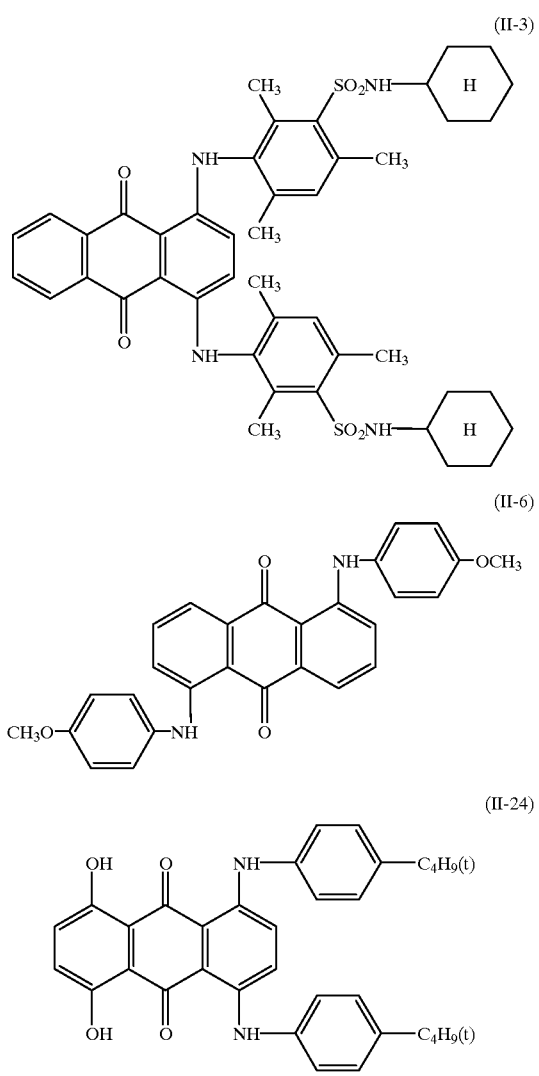

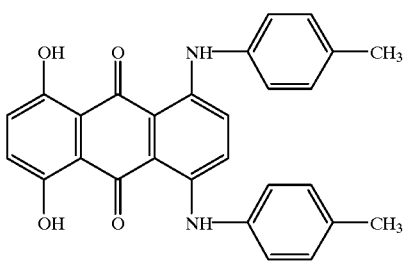

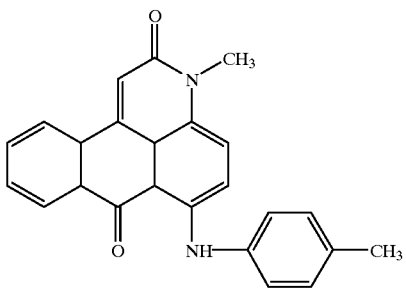

The addition of these dyes is a very effective means, because the thus-obtained film is preferable and useful for a photographic support, in addition light-piping is improved. Each of these dyes may be used singly or in combination thereof. The amount of the dye to be added is generally from 0.001 g/m² to 1 g/m², preferably from 0.005 g/m² to 0.5 g/m². The addition of the dye may be at the time of production of pellets or a film, but it is generally added in the total amount of the dye at the time of the film production.

Further, the thus-obtained support may be subjected to a surface treatment, as described, for example, in KOKAI GIHO No. 94-6023, such as a glow discharge treatment, an ultraviolet-ray treatment, a corona discharge treatment, and a flame treatment, for improvement in adhesion between the support and a photographic emulsion layer coated thereon.

Further, embodiments of the photographic support according to the present invention are explained below.

The thickness of the photographic supports of the present invention is generally within the range of 50 μm or more, but 300 μm or less, preferably 50 to 200 μm, more preferably 80 to 115 μm, and particularly preferably 85 to 105 μm.

The polyester support of the present invention is preferably heat treated.

A heat treatment is carried out at a temperature preferably within the range of 40° C. or more, but less than Tg, more preferably (Tg−20° C.) or more, but less than Tg. The period of time for the heat treatment is generally from 0.1 to 1,500 hours. At a temperature lower than the above range, it takes longer time to obtain sufficient effect on prevention of the core set curl and industrial productivity is worse.

It is preferable to heat-treat at the constant temperature within the above range or while cooling. An average cooling speed is preferably from −0.01 to −20° C./hour, more preferably from −0.1 to −5° C./hour.

In order to further improve the effect on prevention of the core set curl, it is preferred to heat-treat at a temperature of Tg or higher, but lower than the melting point (measured by DSC), prior to the above-described heat treatment, so as to remove thermal hysteresis of the support. Then a reheat treatment is performed at the above-described temperature of 40° C. or more, but less than Tg.

In the present invention, this heat treatment is referred to as "preheat treatment", and the above-described heat treatment at the temperature of 40° C. or more, but less than Tg is referred to as "post-heat treatment". Thus, these treatments are distinguished from each other. Therefore the heat treatment of the present invention can be divided to these preheat treatment and post-heat treatment.

The temperature for the preheat treatment is generally Tg or higher, but lower than the melting point of polyester, and more preferably (Tg+20° C.) or higher, but not higher than the crystallization temperature (measured by DSC).

The period of time for the preheat treatment is generally from 0.1 minute to 1,500 hours.

It is preferred that such a heat treatment of a support can be carried out while conveying a roll-like or web-like support.

The above-mentioned heat treatments may be carried out at any stage subsequent to the production of a support (film), the surface treatment (an ultraviolet ray, glow discharge, corona, or flame treatment), the coating of a backing layer containing an antistatic agent, a lubricant, and the like; or the coating of a subbing layer. A step subsequent to the coating of the antistatic agent is preferred. Such a coating of the antistatic agent is able to prevent adhesion of dust due to electrification, which dust causes a defect on a surface of the support during heat treatment.

In order to give these supports flexibility and the like, plasticizers may be added thereto. In particular, a composition containing a plasticizer, such as triphenyl phosphate, biphenyldiphenyl phosphate, and dimethylethyl phosphate, is usually used in a cellulose ester.

The support may contain a dye for various purposes of neutralization of base coloring, light-piping prevention, and antihalation.

These supports may be subjected to a surface treatment, in order to achieve strong adhesion between the support and a photographic constituting layer (e.g. a light-sensitive silver halide emulsion layer, an interlayer, a filter layer, a magnetic recording layer, an electrically conductive layer), and then a photographic emulsion is coated directly onto the support. For the above-mentioned surface treatment, various surface-activation treatments can be used, such as a chemical treatment, a mechanical treatment, a corona discharge treatment, a flame treatment, an ultraviolet ray treatment, a high-frequency treatment, a glow discharge treatment, an active plasma treatment, a laser treatment, a mixed acid treatment, and an ozone oxidation treatment. Alternatively, once the support is subjected to the above-described surface treatment, or if the surface treatment is omitted, then a subbing layer may be coated on the support, followed by a coating of a photographic emulsion layer on the subbing layer.

Further, a subbing layer is explained below.

For cellulose derivatives, a solution of gelatin dispersed in a mixed organic solvent, consisting of methylene chloride, ketone, and alcohol, is coated, so that a single subbing layer can be provided.

For the polyester-series supports, the following coating methods are available: a so-called multilayer method, in which a layer that is able to adhesive well to a support is coated thereon as the first layer (hereinafter referred to as the first subbing layer), and a hydrophilic resin layer that is able to adhesive well to both the photographic constituting layer and the first subbing layer as the second layer (hereinafter referred to as the second subbing layer) is further coated on the first subbing layer; and a single layer method, in which a single layer of a resin having both a hydrophobic group and a hydrophilic group is coated.

In the first subbing layer according to the multilayer method, the following polymers can be used: copolymers produced by using monomers selected from vinyl chloride, vinylidene chloride, butadiene, methacrylic acid, acrylic acid, itaconic acid, maleic anhydride, and the like as a starting material; and other polymers, such as polyethylene imine, epoxy resins, graft gelatin, and nitrocellulose. Further, the use of gelatin has been considered as a main polymer for the second subbing layer.

On the other hand, in the single layer method, a method in which good adhesion can be achieved by swelling a support, followed by an interfacial mixing of the swollen support with a hydrophilic subbing polymer, is often used. Examples of the hydrophilic subbing polymers include a water-soluble polymer, such as gelatin, gelatin derivatives, casein, agar-agar, sodium alginate, starch, polyvinyl alcohol, a polyacrlylic acid-based copolymer, and a maleic anhydride-based copolymer; a cellulose ester, such as carboxymethyl cellulose and hydroxyethyl cellulose; and a latex polymer, such as a vinyl chloride-containing copolymer, a vinylidene chloride-containing copolymer, an acrylic acid ester-containing copolymer, and a vinyl acetate-containing copolymer, with gelatin preferred.

Further, examples of the compounds that can be used to swell a photographic support include resorcin, chlororesorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid, and chloral hydrate. Preferred of these materials are resorcin and p-chlorophenol.

For the above-mentioned hydrophilic subbing polymers, the above-mentioned hardeners for a hydrophilic polymer are also used.

A subbing solution, if necessary, may contain various kinds of additives, such as a surfactant, an antistatic agent, an antihalation agent, a coloring dye, a pigment, a coating aid, and an antifoggant.

The subbing layer for use in the present invention may contain inorganic fine particles, such as $SiO_2$ and $TiO_2$, or polymethyl methacrylate copolymer fine particles (1 to 10 $\mu$m), as a matting agent.

A sub-coating solution can be coated on a support by any one of generally well-known methods, such as a dip coating, an air-knife coating, a curtain coating, a roller coating, a wirebar coating, a gravure coating, and an extrusion coating using a hopper, as described in the specification of U.S. Pat. No. 2,681,294. Furthermore, according to circumstances, multilayers of two or more layers can be simultaneously coated by a method as described, for example, in the specifications of U.S. Pat. Nos. 2,761,791, 3,508,947, 2,941, 898, and 3,526,528, and in Yuji Harasaki, *Coating Technology* (Coating Kogaku) p. 253 (edited by Asakura Shoten, 1973).

Further, particularly preferably the following fine grains can be used as an antistatic agent that does not lose its electrical conductivity even by a processing: crystalline metal oxide fine grains, in which the metal oxide is at least one selected from the group consisting of $ZnO$, $TiO_3$, $SnO_2$, $Al_2O_3$, $In_2O_3$, $SiO_2$, $MgO$, $BaO$, $MoO_3$, and $V_2O_5$; and fine grains of composite oxides of them. An especially preferable antistatic agent is an electrically conductive material containing $SnO_2$ as a main component, and also containing antimony oxide in an amount of from about 5% to 20%, and/or other components (e.g. silicon oxide, B, P). These electrically conductive crystalline metal oxides, or their composite oxide fine grains, preferably have a volume resistivity of $10^7$ Ω•cm or less, more preferably $10^5$ Ω•cm or less. Further, their grain size of primary grains, in terms of major axis, is preferably from 0.005 to 0.7 μm, particularly preferably from 0.005 to 0.3 μm.

These antistatic agents may be incorporated in at least one of photographic constituting layers, such as a subbing layer on the back side, any one of backing layers, including the most outer backing layer, a subbing layer on the same side on which a photographic emulsion is coated, any one of photographic emulsion layers, an interlayer, and the most outer layer on the same side on which the photographic emulsion layer is coated. In particular, the antistatic agent is preferably incorporated in a more inner layer than the magnetic recording layer on the back side, in order to restrain electrostatic noise as much as possible, at the time of magnetic reproduction. A binder that is used at that time is not limited in particular, and therefore, the binder may be water soluble or organic-solvent soluble, or alternatively it may be a crosslinked binder, like a latex polymer.

Further, preferably these electrically conductive metal oxides exist in a layer in a fashion that primary grains of metal oxides are partially aggregated. It is preferable, from several points of view, to design a light-sensitive material having an antistatic layer containing the above antistatic agent, so that the volume resistivity of the light-sensitive material will be $10^{12}$ Ω•cm or less, more preferably $10^{10}$ Ω•cm or less (25° C./10% RH).

Further, preferably a matting agent is incorporated in a backing layer on a support of a photographic light-sensitive material, from several points of view, such as prevention of creaking caused at the time of handling of the base, occurrence of scratches, blocking between the surface of a subbing layer on the base and the back surface, and blocking between the surface on the same side on which a photographic emulsion layer is coated and the back surface. Further, the use of the matting agent is preferable because stain (e.g. ingredients of a processing solution, dust, and dirt from hands) that has adhered to the back surface of a film can be prevented from transferring to the surface of a magnetic head. The matting agents capable of being used are not limited in particular, but preferably they are inorganic compounds and high molecular compounds whose glass transition temperature (Tg) is 50° C. or higher. These matting agents may be used in a mixture thereof.

Examples of the above-described inorganic compounds include a fine powder of inorganic compounds, which can be used as a matting agent, such as barium sulfate, manganese colloids, titanium dioxide, strontium barium sulfate, and silicon dioxide; and further such as silicon dioxide, such as a synthetic silica that can be obtained by a method, e.g. a wet method and gelation of silicic acid; and also further such as titanium dioxide (rutile type and anatase type) that can be obtained by a reaction of titanium slag with sulfuric acid. Further, the matting agents can also be obtained by grinding an inorganic compound having a relatively large grain size (e.g. 20 μm, or more) into a powder, and then classifying them by means of, for example, vibrating strainer or wind force classification.

Further, examples of the high molecular compounds include polytetrafluoroethylene, cellulose acetate, polystyrene, polymethyl methacrylate, polypropyl methacrylate, polymethyl acrylate, polyethylene carbonate, starch, and their pulverized and classified materials. Further, grains of the following high molecular compounds, produced by such various methods as suspension polymerization, spray-drying, and dispersion, can also be used as a matting agent: high molecular compounds that are homopolymers and copolymers produced by one or more of monomers, such as acrylic acid esters, methacrylic acid esters, itaconic acid diesters, crotonic acid esters, maleic acid diesters, phthalic acid diesters, styrene derivatives, vinyl esters, acrylamides, vinyl ethers, allyl compounds, vinyl ketones, vinyl heterocyclic compounds, acrylonitriles, methacrylonitriles, and multifunctional monomers.

These matting agents may exist as primary grains or secondary aggregate grains, in a coating layer. At this time, the average grain size (diameter) is preferably from 0.1 to 1.5 μm, more preferably from 0.3 to 1.0 μm. Further, the content of these matting agents is generally from 1 to 1000 $mg/m^2$, preferably from 3 to 300 $mg/m^2$, and more preferably from 5 to 100 $mg/m^2$.

Further, preferably abrasives are incorporated in a backing layer, from the viewpoint that even though stain is adhered to the surface of a magnetic head, it can be removed by abrasives. Further, the use of abrasives preferably provides such several advantages as that a scratched or oxidized surface of the magnetic head can be polished, and consequently contact of the magnetic head with a film can be rendered smoother, and the further advantage that the capacity of the magnetic head can be recovered.

Preferably abrasives for use are nonspherical inorganic grains having Mohs' hardness values of not less than 5, from the viewpoint that stain that has adhered to a magnetic head can be effectively cleaned.

Preferable examples of the composition of the nonspherical inorganic grains are oxides, such as aluminum oxides (e.g. α-alumina, γ-alumina, corundum), chromium oxides (e.g. $Cr_2O_3$), iron oxides (e.g. α-$Fe_2O_3$), silicon dioxide, and titanium dioxide; carbides, such as silicon carbide (SiC) and titanium carbide; and a fine powder of such as diamond, with aluminum oxides and chromium oxides more preferred. These abrasives may exist as primary grains or secondary aggregate grains (chain structure), in a coating layer. At this time, an average grain size is preferably from 0.1 to 1.5 μm, more preferably from 0.3 to 1.0 μm. Further, the content of the abrasives is generally from 1 to 1000 $mg/m^2$, preferably from 3 to 300 $mg/m^2$, and more preferably from 5 to 100 $mg/m^2$.

Further, preferably fluoro compounds (fluorine-containing compounds) are incorporated in a backing layer, from the viewpoint that adhesion of a stain to the back surface is prevented, which restrains the transfer of stain to the surface of a magnetic head and therefore reduces magnetic input/output problems. The fluorine-containing compound for use in the present invention is a compound containing at least three fluorine atoms; it may be a surfactant or a polymer. These compounds may contain a nonionic, anionic, cationic, or betain-type functional group as a hydrophilic group. Preferred of these functional groups are anionic, cationic, and betain-type groups, with anionic groups particularly preferred.

The amount to be used of the fluoro compound for use is preferably from 0.1 mg to 1 g, more preferably from 0.5 to 100 mg, further preferably from 1 to 30 mg, and most preferably from 1.5 to 15 mg, per $m^2$ of the photographic light-sensitive material, respectively.

The addition layer of the fluoro compound for use is not limited in particular, but it may be any one or more of layers, such as a subbing layer, an antistatic layer, a magnetic recording layer, and a slipping (lubricant) layer. Preferred of these layers is the most outer layer on the same side on which a photographic emulsion layer is coated, and/or on the back side.

Further, the backing layer may contain other additives, such as a dye and a surfactant.

A slipping agent (lubricant) is described below in detail.

The slipping agent is incorporated in a surface layer of the light-sensitive material. The surface layer may be a surface layer on the same side on which a photographic emulsion layer is coated. However, it is much more effective to incorporate the slipping agent in a back surface layer rather than the above-mentioned surface layer, because the back surface more often directly contacts various machine parts, at the time of handling of the photographic light-sensitive material.

The following known compounds can be used as a slipping agent: polyorganosiloxanes, higher fatty acid amides, higher fatty acid esters (esters of fatty acids having 10 to 24 carbon atoms and alcohols having 10 to 24 carbon atoms), metal salts of higher fatty acids, esters of straight-chain higher fatty acids and straight-chain higher alcohols, esters of higher fatty acids having a branched alkyl group and higher alcohols, and the like.

Examples of the polyorganosiloxanes to be used include generally known compounds, such as polyalkylsiloxanes (e.g. polydimethylsiloxane and polydiethylsiloxane), and polyarylsiloxanes (e.g. polydiphenylsiloxane and polymethylphenylsiloxane); and in addition, modified polysiloxanes, such as organopolysiloxanes containing an alkyl group having not less than 5 carbon atoms, alkylpolysiloxanes having a polyoxyalkylene group at the side chain, and organopolysiloxanes having an alkoxy group, a hydroxy group, a hydrogen atom, a carboxyl group, an amino group, and/or a mercapto group at the side chain, as disclosed in, for example, JP-B ("JP-B" means examined Japanese patent publication) Nos. 292/1978, 49294/1980, and JP-A No. 140341/1985; block copolymers having a siloxane unit; and graft copolymers having a siloxane unit at the side chain, as disclosed in JP-A No. 191240/1985.

Further, the following compounds can be used as the higher fatty acids and their derivatives, and as the higher alcohols and their derivatives: higher fatty acids, metal salts of higher fatty acids, higher fatty acid esters, higher fatty acid amides, esters of higher fatty acids and polyhydric alcohols, and in addition, higher aliphatic alcohols, monoalkylphosphites of higher aliphatic alcohols, dialkyl phosphites of higher aliphatic alcohols, trialkylphosphites of higher aliphatic alcohols, monoalkylphosphates of higher aliphatic alcohols, dialkylphosphates of higher aliphatic alcohols, trialkylphosphates of higher aliphatic alcohols; and esters of higher aliphatic alcohols and alkyl sulfonic acid, their amide compounds, and their salts.

The amount of the slipping agent to be used to manifest a sufficient slipping property and scratch resistance is preferably from 0.001 to 0.1 g/m$^2$, more preferably from 0.005 to 0.05 g/m$^2$. The slipping agents having a hydroxyl group and/or an amino group are especially preferred.

The compounds exhibit a high hydrophobic property, and therefore many of them are poorly soluble in a solvent. Consequently, use can be made of a method in which they are dissolved in a nonpolar organic solvent, such as toluene, and xylene; or alternatively a method in which they are dispersed in a coating solution, with the latter preferred, because a nonpolar organic solvent is difficult to handle.

Particularly preferably, a binder that is capable of forming a film is incorporated in the layer containing these compounds, from such points of view as improvement in smoothness of the slipping agent-containing coating layer, and improvement in film strength thereof. Example polymers for use are known thermalplastic resins, thermal-setting resins, radiation-setting resins, reactive resins, and a mixture thereof, and hydrophilic binders, such as gelatin.

Specifically, examples of the thermal plastic resin include cellulose derivatives, such as cellulose triacetate, cellulose diacetate, cellulose acetate maleate, cellulose acetate phthalate, hydroxyacetylcellulose phthalate, cellulose long-chain alkyl esters, nitrocellulose, cellulose acetate propionate, cellulose acetate butylate resin; vinyl copolymers, such as vinyl chloride/vinyl acetate copolymer, vinyl chloride or vinyl acetate/vinyl alcohol, maleic acid and/or acrylic acid copolymer, vinyl chloride/vinylidene chloride copolymer, vinyl chloride/acrylonitrile copolymer, and ethylene/vinyl acetate copolymer; acrylic acid resins, polyvinyl acetal resins, polyvinyl butyral resins, polyester polyurethane resins, polyether polyurethane resins, polycarbonate polyurethane resins, polyester resins, polyether resins, polyamide resins, amino resins; gum resins, such as stylene/butadiene resins and butadiene/acrylonitryl resins; silicone resins, and fluoric resins.

Further, radiation-setting resins for use include those in which a group having a carbon-carbon unsaturated bond as a functional group for the radiation-setting is connected to the above-described thermal plastic resin. Preferable examples of such a functional group are an acryloyl group and a methacryloyl group.

To the above-described bound molecules, a polar group may be introduced (an epoxy group, $CO_2M$, $OH$, $NR_2$, $NR_3^+X^-$, $SO_3M$, $OSO_3M$, $PO_3M_2$, $OPO_3M_2$, wherein M represents a hydrogen atom, an alkali metal, or an ammonium group; and when there are two or more M's in a group, they may be different from each other; R represents a hydrogen atom or an alkyl group; and $X^-$ represents a halide ion).

The above-illustrated high-molecular binders may be used singly or in a mixture thereof. They can be used for a setting treatment with a known crosslinking agent of isocyanate type, and/or a radiation-setting vinyl monomer.

Further, examples of the hydrophilic binder include a water-soluble polymer, a cellulose ester, a latex polymer, and a water-soluble polyester, as shown in Research Disclosure No. 17643, page 26, and ibid. No. 18716, page 651. Examples of the water-soluble polymer include gelatin, gelatin derivatives, casein, agar-agar, sodium alginate, starch, polyvinyl alcohol, polyacrylic acid copolymer, and maleic acid anhydride copolymer. Examples of the cellulose ester are carboxymethyl cellulose, hydroxyethyl cellulose, hydroxypropyl cellulose, ethyl cellulose, and methyl cellulose. Examples of the latex polymer are vinyl chloride-containing copolymer, anhydrous vinylidene-containing copolymer, acrylic acid ester-containing copolymer, vinyl acetate-containing copolymer, and butadien-containing copolymer. Gelatin is most preferred among these polymers. Further, another hydrophilic binder, such as gelatin derivatives, may be used with gelatin.

A protective layer containing a hydrophilic binder described above may be hardened with a hardening agent. Example hardening agents that may be used are aldehyde compounds, such as formaldehyde and glutaraldehyde; ketone compounds, such as diacetyl and cyclopentanedione; bis(2-chloroethylurea), 2-hydroxy-4,6-dichloro-1,3,5-triazine, and other reactive halogen-containing compounds; divinylsulfone, 5-acetyl-1,3-diacryloylhexahydro-1,3,5-triazine, and other reactive olefin-containing compounds;

N-hydroxymethylphthalimide, N-methylol compounds, isocyanate compounds, aziridine compounds, acid derivatives, epoxy compounds, and halogen carboxy aldehydes, such as mucochloric acid. Further, example inorganic hardening agents are chrome alum and zirconium sulfate. And additionally, active carboxyl group-containing hardening agents can be used.

Particularly preferred of these binders are those containing a polar substituent in their molecules. Examples of the polar substituent are —OH, —COOH, —COOM, —NH$_3$, —NR$_4^+$, —CONH$_2$, —SH, —OSO$_3$M, and —SO$_3$M. An especially preferred specific example of the binder is acetylcellulose.

Some additives may be added to a layer containing the above-mentioned slipping agent, in order to impart other functions. For example, a surfactant having a sulfonic acid group or a sulfuric acid ester group as a hydrophilic portion is preferably used as such an additive, to improve cissing (repelling) due to a hydrophobic slipping agent.

The amount of the additive to be added is preferably in the range of from 0.001 g/m$^2$ to the same amount as the slipping agent (solid content), more preferably from 0.005 g/m$^2$ to half the amount of the slipping agent (solid content).

The above-mentioned slipping agent-containing layer can be prepared by coating and drying a coating solution having the slipping agent dissolved or dispersed in water, or another suitable organic solvent, on a support, or on a support having other layers coated on its back surface. Alternatively, such layer can also be prepared by coating the coating solution at the time of an emulsion coating.

In order to disperse a slipping agent, use can be made of generally known emulsification dispersion methods, specific examples of which include a method in which a solution of an organic solvent having a slipping agent dissolved therein is emulsified in water; a method in which a slipping agent that was melted at a high temperature is emulsified in water; and a solid dispersion method using a ball-mill or a sand grinder. These emulsification dispersion methods are described in a textbook, such as the *Nyuka•Bunsan Gijutsu Oyo Handbook*, edited by Karigome, Koishi, and Hidaka (published by Science Forum).

Further, various kinds of methods can be used to disperse a slipping agent in an organic solvent. In order to disperse the slipping agent in an organic solvent, use can be made of generally known methods. Specifically, preferred methods are one in which a slipping agent is solid-dispersed in an organic solvent by means of a ball-mill, a sand grinder, and the like; a method in which, first, a slipping agent is dissolved in an organic solvent at an elevated temperature, and then the thus-obtained solution is cooled with stirring, to precipitate and disperse the slipping agent therein; a method in which, first, a slipping agent is dissolved in an organic solvent at an elevated temperature, and then the thus-obtained solution is added to an organic solvent at normal room temperature, or to a cooled organic solvent, followed by cooling and precipitation, to disperse the shipping agent therein; and a method in which organic solvents that are immiscible with each other are mutually emulsified. Preferred of these methods is one in which, first, a slipping agent is dissolved in an organic solvent at an elevated temperature, and then the thus-obtained solution is added to an organic solvent at normal room temperature, or a cooled organic solvent, followed by cooling and precipitation, to disperse the slipping agent. The organic solvent that is used for this dispersion is not limited in particular, but a cooling solvent to which a solution containing a slipping agent is added is preferably a high polar solvent. Particularly preferably is a method in which a slipping agent is dissolved in a solvent by heating at a temperature of from 60° C. to 150° C., and then the thus-obtained solution is dispersed in a cooling solvent in which the solubility of the slipping agent is not more than 1% at the normal room temperature. Particularly preferred of the solvents in which the solubility of the slipping agent is not more than 1% at normal room temperature, are ketones and alcohols, from the viewpoint of excellent dispersibility. Further, as a disperser that is used for this dispersion, usual stirrers can be used, with an ultrasonic disperser and a homogenizer particularly preferred.

With respect to a diluting solvent for a coating, any kind of solvent may be used, unless the dispersion stability or the solubility of the slipping agent is deteriorated. Preferable examples of these diluting solvents include water, water containing various kinds of surfactants, alcohols (e.g. methanol, ethanol, isopropanol, butanol), ketones (e.g. acetone, methylethylketone, cyclohexane), and esters (e.g. methyl, ethyl, propyl, or butyl esters of acetic acid, formic acid, oxalic acid, maleic acid, or succinic acid).

Generally, in order to give surface lubricity (slipping property) to a polyester film, it is said that particles of an inactive inorganic substance should preferably be contained, in the order of 300 ppm. However, such an addition of inorganic particles may impair the transparency of a film. In order to provide lubricity while maintaining transparency, it is preferable for a film to contain a crushed-type silica having an average particle diameter of 0.1 to 1.0 μm, in an amount of 5 ppm or more but less than 100 ppm, preferably 10 to 70 ppm.

Generally, particles of an inactive inorganic substance, such as silica, are added at the time of the production of a polyester. Alternatively, the particles may be mixed with a polyester at the time of the film-production. Further, use can be made of a master pellet that contains relatively large amounts of particles of an inactive inorganic substance.

As particularly preferable typical examples of the silver halide color photographic light-sensitive material, color reversal films and color negative films can be mentioned. In particular, general-purpose color negative films are preferable color photographic light-sensitive materials.

Descriptions will be made hereinbelow with reference to general-purpose color negative films.

It is sufficient that the light-sensitive material has, on a support, at least one silver halide emulsion layer of a blue-sensitive layer, a green-sensitive layer, or a red-sensitive layer, and there is no particular restriction on the number of silver halide emulsion layers and nonsensitive layers or on the order of these layers. A typical example is a silver halide photographic light-sensitive material having, on a support, at least one photosensitive layer comprising multiple silver halide emulsion layers that have substantially the same color sensitivity but are different in photographic sensitivity, wherein said photosensitive layer is a unit photosensitive layer having color sensitivity to any one of blue light, green light, and red light. In the case of a multilayer silver halide color photographic light-sensitive material, generally the arrangement of unit photosensitive layers is such that a red-sensitive layer, a green-sensitive layer, and a blue-sensitive layer are placed in the stated order from the support side. However, the order of the arrangement may be reversed in accordance with the purpose, and between layers having the same color sensitivity there may be placed a different photosensitive layer.

Known photographic additives that can be used for a light-sensitive material are also described in the above-mentioned two Research Disclosures, and involved sections are listed in the same Table below.

| | Kind of Additive | RD 17643 | RD 18716 | |
|---|---|---|---|---|
| 1 | Chemical sensitizers | p. 23 | p. 648 | (right column) |
| 2 | Sensitivity-enhancing agents | — | p. 648 | (right column) |
| 3 | Spectral sensitizers and Supersensitizers | pp. 23–24 | pp. 648–649 | (right column) (right column) |
| 4 | Brightening agents | p. 24 | — | |
| 5 | Antifogging agents and Stabilizers | pp. 24–25 | p.649 | (right column) |
| 6 | Light absorbents, Filter dyes and Ultraviolet absorbents | pp. 25–26 | p. 649–650 | (right column) (left column) |
| 7 | Stain-preventing agent | p. 25 (right column) | p.650 | (left to right column) |
| 8 | Color image stabilizers | p. 25 | — | |
| 9 | Film hardeners | p. 26 | p. 651 | (left column) |
| 10 | Binders | p. 26 | p. 651 | (left column) |
| 11 | Plasticizers and Lubricants | p. 27 | p. 650 | (right column) |
| 12 | Coating aids and Surface-active agents | pp. 26–27 | p. 650 | (right column) |

A polyester-series photographic support that is excellent in transparency and flatness, and that particularly contains only a minimum amount of foreign matter (extraneous matter), and that further has no yellowish color, can be provided by the method of the present invention.

EXAMPLES

The present invention is explained below with reference to specific examples, but the present invention is not limited by these. Herein, the "part" referred to in these examples means a weight part, unless otherwise specified. The observed values of various kinds were measured according to the following methods:

Intrinsic viscosity (IV): A solution of the test polymer dissolved in a mixture of phenol/tetrachloroethane (mixed ratio 6/4 by weight parts) was measured at 25° C. The measurement was conducted by varying the concentration of the test polymer in the solution, and it was repeated four times at different concentrations.

Melt electric resistance (log R): Dried pellets were placed in a test tube, and then they were melted on an oil bath at 300° C. Immersed in the melted polymer were 5-cm lengths (portions) of a set of electrodes, which electrodes were composed of two sticks (manufactured by SUS) of 2 mm diameter, with 1 cm distance being set between the two sticks. The value of electric resistance (R) between the two electrodes was measured by means of a tester (Trade name: 4329A HIGH RESISTANCE METER, manufactured by YOKOKAWA•HEWLETT-PACKARD CO.). The value was shown in terms of common logarithm (log R).

Film haze: The film haze was measured by a turbidimeter manufactured by NIPPON DENSHOKU Company.

Center line average roughness (Ra): Measurement was carried out on the following conditions: the diameter of the needle for measurement of 2 $\mu$m, load of 70 mg, and cut-off of 80 $\mu$m.

Tear strength: Measurement was carried out according to JISP8116-1976. Tests were conducted by means of a pendulum tester, and test samples, each consisting of 3 films piled together, were torn at once. A value of not less than 130 g is a desirable strength.

The value b of film: Test samples, each consisting of 3 films piled together, were measured by means of a color difference meter manufactured by NIPPON DENSHOKU Company.

Light transmittance: Light transmittance of the test film was measured by means of a self-recording spectrophotometer, a UV-2100 (trade name, manufactured by SHIMADZU SEISAKUSHO Co.).

Foreign matter in the film: The number of foreign matter particles, of size 20 $\mu$m or larger, per 5 $cm^2$ was counted using a polarizing microscope. A count of 50 or less is preferable for the present invention, and a count of 100 or more is not suitable for the present invention.

EXAMPLE 1

Production of Polyester Pellets

In a reaction furnace equipped with a stirrer, a rectification column, and an $N_2$ introduction tube, were placed 13.7 kg of NCM, 8.0 kg of ethylene glycol, manganese acetate tetrahydrate (75 ppm in terms of manganese element), and antimony trioxide (200 ppm in terms of antimony element). After air in the furnace was replaced with $N_2$, the temperature in the furnace was gradually increased while stirring was conducted. When the temperature of the solution was increased to about 180° C., a reaction started, and methanol began to flow out. The temperature of the solution was then further increased, to 250° C., and the reaction was completed in about 4 hours.

Oligomers (solution) that had been subjected to the reaction of transesterification were transferred to a polymerization condensation reaction furnace heated to 260° C., which furnace was equipped with a stirrer, a distilling-off tube, an $N_2$ introduction tube, and a discharge pipe for a polymer at the bottom of the furnace. While stirring was conducted, trimethyl phosphate (55 ppm in terms of phosphorus element) was added to the above-described reaction furnace, and then the reaction system was evacuated. The degree of vacuum was gradually increased, ultimately to 0.5 mm Hg. Further, the temperature of the solution was increased, ultimately to 285° C. The melt viscosity was measured by a torque meter built in the stirrer. The reaction was quenched when the melt viscosity reached the pre-determined torque value. Consequently, this reaction took about 3.5 hours.

The reaction system was returned to an ordinary pressure with $N_2$. After that, a polymer was taken out of the discharge pipe in the bottom of the furnace, under pressure. The polymer thus obtained, in the form of strands, was cooled in a water tank, and the solid polymer was cut into pellets.

Preparation of a Film

Dried pellets were placed in an extruder heated to a temperature between 280° C. and 300° C. A pre-hardened sheet, that was taken out of the mouthpiece of the extruder, was cooled on a cooling drum, to harden it, whereby an unstretched sheet was prepared. At this time, an electrode composed of a fine line was set between the mouthpiece of the extruder and the cooling drum, and then direct current voltage of 9 KV was impressed between the fine line and the cooling drum. Further, the unstretched sheet was subjected to biaxially stretching to 3.5-fold its size in the longitudinal direction and in the horizontal direction, at 140° C., by means of a Labo-scale stretcher, manufactured by Long Company. The stretched sheet was further subjected to a heat-setting at 230° C. for 30 sec., to obtain a film of 90 $\mu$m thickness.

With reference to dyes, 66 ppm of exemplified compound III-5, and 50 ppm of exemplified compound II-6, were each dried, and then they were mixed with pellets, to produce the film.

The composition and obtained characteristics are shown in Tables 1 and 2, respectively.

As is apparent from the results shown in the Tables, a film that contained a small amount of foreign matter, and that also excelled in transparency, could be obtained. Further, according to the method of the present invention, a film that was excellent in color tone, and in which elution and decomposition of the dyes were prevented, could be obtained.

Further, a subbing layer, a back coat layer, and a photographic emulsion layer, as described in Examples 1 to 7 of KOKAIGIHO, KOGI No. 94-6023, were coated on the support of the present invention. Consequently, it was confirmed that there were no problems in particular.

EXAMPLES 2 and 3

Various PEN samples were prepared by altering the amount of various kinds of additives to be added in the production of the pellets in Example 1. With reference to the dye for use in the production of a film, 54 ppm of exemplified compound II-24, and 54 ppm of exemplified compound II-6, were dried, and then they were mixed with the pellets, to produce a film.

The compositions of the reaction solution for the production of the polyester pellets, and the characteristics of the polyester film, are shown in Tables 1 and 2, respectively.

EXAMPLE 4

Pellets were manufactured in the same manner as in Example 1, except for employing dimethyl terephthalate in place of 15 mol % of NCM.

A film was produced in the same manner as in Example 1.

The compositions of the reaction solution for the production of the polyester pellets, and the characteristics of the polyester film, are respectively shown in Tables 1 and 2.

Comparative Examples 1 to 3

Pellets were manufactured in the same manner as in Example 1, except for altering the amount of various kinds of additives to be added.

In the next stage, the production of a film was carried out in the same manner as in Example 1, except for adding no dye to the film.

The compositions of the reaction solution for the production of the polyester pellets, and the characteristics of the polyester film, are respectively shown in Tables 1 and 2.

TABLE 1

| | Composition of acid components and additives | | | | | | |
|---|---|---|---|---|---|---|---|
| | NCM*1 Charged amount | DMT*2 Charged amount | Mn*3 Charged amount | P*4 Charged amount | Mg*5 Charged amount | Sb*6 Charged amount | Dye Type and amount |
| Example 1 | 100 mol % | — | 75 ppm (1.37) | 55 ppm (1.77) | — | 200 ppm (1.64) | III-5: 66 ppm II-6: 50 ppm |
| Example 2 | 100 mol % | — | 70 ppm (1.28) | 40 ppm (1.29) | 25 ppm (1.03) | 200 ppm (1.64) | II-24: 54 ppm II-6: 54 ppm |
| Example 3 | 100 mol % | — | 60 ppm (1.09) | 30 ppm (0.97) | 30 ppm (1.23) | 180 ppm (1.48) | II-24: 54 ppm II-6: 54 ppm |
| Example 4 | 85 mol % | 15 mol % | 75 ppm | 55 ppm | — | 200 ppm | III-5: 66 ppm II-6: 50 ppm |
| Comparative example 1 | 100 mol % | — | 75 ppm (1.37) | 15 ppm (0.48) | 60 ppm (2.47) | 200 ppm (1.64) | — |
| Comparative example 2 | 100 mol % | — | 75 ppm (1.37) | 55 ppm (1.77) | — | 200 ppm (1.64) | — |
| Comparative example 3 | 100 mol % | — | 75 ppm (1.37) | 30 ppm (0.97) | 60 ppm (2.47) | 180 ppm (1.48) | — |

The value in "( )" represents converted value in terms of the number of moles per $10^6$ g polyester.
Note:
*1NCM: 2,6-Naphthalenedicarboxylic acid di-methyl ester
*2DMT: Terephthalic acid di-methyl ester
*3Mn: Amount of manganese compound in terms of manganese element
*4P: Amount of phosphorous compound in terms of phosphorus element
*5Mg: Amount of magnesium compound in terms of magnesium element
*6Sb: Amount of antimony compound in terms of antimony element

TABLE 2

| | Characteristics of the polyester | | | | | | | |
|---|---|---|---|---|---|---|---|---|
| | IV | log R | Ra | Haze (%) | b Value | Tear strength (g) | Foreign matter (number) | Light transmittance at 400 nm (%) |
| Example 1 | 0.584 | 9.1 | 0.002 | 0.6 | 2.5 | 140 | 30 | 68 |
| Example 2 | 0.575 | 8.0 | 0.007 | 0.7 | 3.2 | 138 | 35 | 67 |

TABLE 2-continued

Characteristics of the polyester

|  | IV | log R | Ra | Haze (%) | b Value | Tear strength (g) | Foreign matter (number) | Light transmittance at 400 nm (%) |
|---|---|---|---|---|---|---|---|---|
| Example 3 | 0.580 | 7.5 | 0.003 | 0.6 | 3.5 | 135 | 45 | 68 |
| Example 4 | 0.595 | 8.5 | 0.005 | 0.8 | 3.0 | 145 | 25 | 68 |
| Comparative example 1 | 0.576 | 6.7 | 0.002 | 0.6 | 7.5 | 141 | >100 | 72 |
| Comparative example 2 | 0.576 | 8.2 | 0.0035 | 0.6 | 5.5 | 135 | 35 | 77 |
| Comparative example 3 | 0.475 | 6.9 | 0.095 | 1.5 | 6.5 | 115 | >100 | 75 |

Having described our invention as related to the present embodiments, it is our intention that the invention not be limited by any of the details of the description, unless otherwise specified, but rather be construed broadly within its spirit and scope as set out in the accompanying claims.

What I claim is:

1. A method of manufacturing a polyester-series photographic support, comprising the steps of:

incorporating at least one anthraquinone-series dye, in an amount sufficient to prevent the support from yellowing by heating during production of pellets or a film, into a polyester consisting essentially of polyethylene naphthalate, which polyester is produced by a condensation polymerization reaction of a dicarboxylic acid component that comprises a dialkyl ester of naphthalene-2,6-dicarboxylic acid as a main component, with a diol component that comprises ethylene glycol as a main component, the polyester being produced by allowing elements to be incorporated in amounts as defined by formulae (1) to (3), whereby the obtained polyester has melt electric resistance in terms of common logarithm (log R) in the melt state at 300° C. in the range of from 7.0 to 9.5, and intrinsic viscosity, measured in a mixture solution of phenol/tetrachloroethane (6/4, weight ratio) at 25° C., in the range of from 0.49 to 0.65; processing the thus-obtained polyester to a film according to the electrostatic impression method; and subjecting the film to biaxially stretching, to form a transparent film that has center line average roughness (Ra) in the range of from 0.0005 to 0.05, and film haze of not more than 1.5%:

$0.82 \leq M \leq 3.20$ (1)

$0.95 \leq S_b \leq 2.45$ (2)

$0.20 \leq P/M \leq 2.75$ (3)

wherein M represents a manganese element or a magnesium element, or a mixture thereof, and the amount means a number of moles of said manganese or magnesium element, or of said mixture thereof, per $10^6$ g of the polyester; $S_b$ represents an antimony element, and the amount means a number of moles of said antimony element per $10^6$ g of the polyester; and P represents a phosphorus element, and the amount means a number of moles of said phosphorus element per $10^6$ g of the polyester.

2. The method of manufacturing a polyester-series photographic support as claimed in claim 1, wherein the formed transparent film has transmittance at 400 nm in terms of the thickness of the film of 90 μm of not less than 65%, and the b value of three piled sheets of the film of not more than 4.5.

3. The method of manufacturing a polyester-series photographic support as claimed in claim 1, wherein the anthraquinone-series dye incorporated in the support is a dye selected from compounds represented by general formula (I) or (II):

General formula (I)

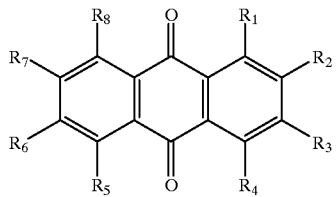

wherein $R_1$, $R_2$, $R_3$, $R_4$, $R_5$, $R_6$, $R_7$, and $R_8$ each represent a hydrogen atom, a hydroxyl group, an aliphatic group, an aromatic group, a heterocyclic group, a halogen atom, a cyano group, a nitro group, $COR_9$, $COOR_9$, $NR_9R_{10}$, $NR_{10}COR_{11}$, $NR_{10}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$, or $SO_2NHCOR_{11}$; $R_9$ and $R_{10}$ each represent a hydrogen atom, an aliphatic group, an aromatic group, or a heterocyclic group; $R_{11}$ represents an aliphatic group, an aromatic group, or a heterocyclic group; $R_9$ and $R_{10}$ may bond together to form a 5- or 6-membered ring; and $R_1$ and $R_2$, or $R_2$ and $R_3$, may bond together to form a ring, General formula (II)

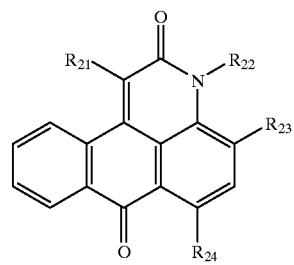

wherein $R_{21}$, $R_{23}$, and $R_{24}$ each represent a hydrogen atom, a hydroxyl group, an aliphatic group, an aromatic group, a cyano group, a nitro group, $COR_{29}$, $COOR_{29}$, $NR_{29}R_{30}$, $NR_{29}COR_{31}$, or $NR_{30}SO_2R_{31}$; $R_{22}$ represents an aliphatic group or an aromatic group; $R_{29}$ and $R_{30}$ each have the same meanings as $R_9$ and $R_{10}$ in general formula (I); $R_{31}$ has the same meaning as $R_{11}$ in general formula (I), with the proviso that at least one of $R_{21}$, $R_{22}$, $R_{23}$, and $R_{24}$ is a group other than a hydrogen atom.

4. The method of manufacturing a polyester-series photographic support as claimed in claim 3, wherein the aliphatic group represented by $R_1$ to $R_{11}$, $R_{21}$ to $R_{24}$, and $R_{29}$ to $R_{31}$ is an alkyl group, a cycloalkyl group, or an allyl group.

5. The method of manufacturing a polyester-series photographic support as claimed in claim 1, wherein the amount of the anthraquinone-series dye to be added is from 0.001 $g/m^2$ to 1 $g/m^2$.

6. The method of manufacturing a polyester-series photographic support as claimed in claim 1, wherein the thickness of a pre-stretched film for the support is from 0.45 mm to 2.5 mm, and the thickness of a biaxially stretched film is from 50 μm to 120 μm.

7. The method of manufacturing a polyester-series photographic support as claimed in claim 1, wherein the width of a pre-stretched film for the support is from 0.2 m to 3 m.

8. The method of manufacturing a polyester-series photographic support as claimed in claim 1, wherein the manganese and/or magnesium elements are added in the form of acetates thereof.

9. The method of manufacturing a polyester-series photographic support as claimed in claim 1, wherein the antimony element is added as antimony trioxide.

10. The method of manufacturing a polyester-series photographic support as claimed in claim 1, further comprising heat treating the film at a temperature of 40° C. or more, but less than the glass transition point temperature $T_g$ of the film.

11. The method of manufacturing a polyester-series photographic support as claimed in claim 1, wherein the polyester is polyethylene naphthalate.

12. The method of manufacturing a polyester-series photographic support as claimed in claim 1, wherein formulae (1) to (3) are as follows:

$$0.95 \leq M \leq 2.65 \qquad (1)$$

$$1.22 \leq Sb \leq 2.05 \qquad (2)$$

$$0.25 \leq P/M \leq 2.50 \qquad (3).$$

13. A polyester-series photographic support, made up of a biaxially stretched and orientated film, which film is comprised of a polyester consisting essentially of polyethylene naphthalate, and incorporating elements in amounts as defined by formulae (1) to (3), the polyester having melt electric resistance in terms of common logarithm (log R) in the melt state at 300° C. in the range of from 7.0 to 9.5, and intrinsic viscosity, measured in a mixture solution of phenol/tetrachloroethane (6/4, weight ratio) at 25° C., in the range of from 0.49 to 0.65, wherein the film is transparent and has center line average roughness (Ra) in the range of from 0.0005 to 0.05, and film haze of not more than 1.5%, and wherein the film incorporates at least one anthraquinone-series dye, in an amount sufficient to prevent the support from yellowing by heating during production of pellets or a film:

$$0.82 \leq M \leq 3.20 \qquad (1)$$

$$0.95 \leq S_b \leq 2.45 \qquad (2)$$

$$0.20 \leq P/M \leq 2.75 \qquad (3)$$

wherein M represents a manganese element or a magnesium element, or a mixture thereof, and the amount means a number of moles of said manganese or magnesium element, or of said mixture thereof per $10^6$ g of the polyester; $S_b$ represents an antimony element, and the amount means a number of moles of said antimony element per $10^6$ g of the polyester; and P represents a phosphorus element, and the amount means a number of moles of said phosphorus element per $10^6$ g of the polyester.

14. The polyester-series photographic support as claimed in claim 13, wherein the film has transmittance at 400 nm in terms of the thickness of the film of 90 μm of not less than 65%, and the b value of three piled sheets of the film of not more than 4.5.

15. The polyester-series photographic support as claimed in claim 13, wherein the anthraquinone-series dye is a dye selected from compounds represented by general formula (I) or (II):

General formula (I)

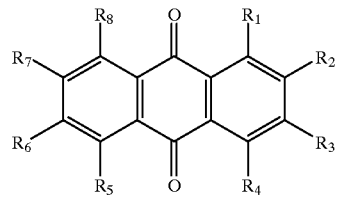

wherein $R_1$, $R_2$, $R_3$, $R_4$, $R_5$, $R_6$, $R_7$, and $R_8$ each represent a hydrogen atom, a hydroxyl group, an aliphatic group, an aromatic group, a heterocyclic group, a halogen atom, a cyano group, a nitro group, $COR_9$, $COOR_9$, $NR_9R_{10}$, $NR_{10}COR_{11}$, $NR_{10}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$, or $SO_2NHCOR_{11}$; $R_9$ and $R_{10}$ each represent a hydrogen atom, an aliphatic group, an aromatic group, or a heterocyclic group; $R_{11}$ represents an aliphatic group, an aromatic group, or a heterocyclic group; $R_9$ and $R_{10}$ may bond together to form a 5- or 6-membered ring; and $R_1$ and $R_2$, or $R_2$ and $R_3$, may bond together to form a ring, General formula (II)

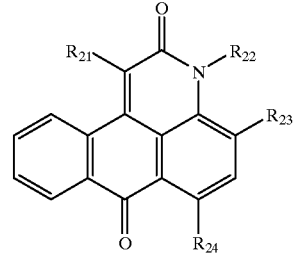

wherein $R_{21}$, $R_{23}$, and $R_{24}$ each represent a hydrogen atom, a hydroxyl group, an aliphatic group, an aromatic group, a cyano group, a nitro group, $COR_{29}$, $COOR_{29}$, $NR_{29}R_{30}$, $NR_{29}COR_{31}$, or $NR_{30}SO_2R_{31}$; $R_{22}$ represents an aliphatic group or an aromatic group; $R_{29}$ and $R_{30}$ each have the same meanings as $R_9$ and $R_{10}$ in general formula (I); $R_{31}$ has the same meaning as $R_{11}$ in general formula (I), with the proviso that at least one of $R_{21}$, $R_{22}$, $R_{23}$, and $R_{24}$ is a group other than a hydrogen atom.

16. The polyester-series photographic support as claimed in claim 15, wherein the aliphatic group represented by $R_1$ to $R_{11}$, $R_{21}$ to $R_{24}$, and $R_{29}$ to $R_{31}$ is an alkyl group, a cycloalkyl group, or an allyl group.

17. The polyester-series photographic support as claimed in claim 15, wherein the aromatic group represented by $R_1$ to $R_{11}$, $R_{21}$ to $R_{24}$, and $R_{29}$ to $R_{31}$ is an aryl group.

18. The polyester-series photographic support as claimed in claim 15, wherein the heterocyclic group represented by $R_1$, to $R_{11}$, and $R_{29}$ to $R_{31}$ is a 5- or 6-membered heterocyclic ring.

19. A polyester-series photographic support as claimed in claim 13, which has been heat treated at a temperature of 40° C. or more, but less than the glass transition point temperature $T_g$ of the film.

20. A polyester-series photographic support as claimed in claim 13, wherein the polyester is polyethylene naphthalate.

* * * * *